(12) United States Patent
Addiego et al.

(10) Patent No.: US 7,244,689 B2
(45) Date of Patent: Jul. 17, 2007

(54) METHOD OF PRODUCING ALUMINA-SILICA CATALYST SUPPORTS

(75) Inventors: William P. Addiego, Big Flats, NY (US); Kevin R. Brundage, Corning, NY (US); Christopher R. Glose, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 159 days.

(21) Appl. No.: 10/715,602

(22) Filed: Nov. 17, 2003

(65) Prior Publication Data

US 2005/0107250 A1    May 19, 2005

(51) Int. Cl.
*B01J 23/02* (2006.01)
*B01J 20/00* (2006.01)
*B01J 21/00* (2006.01)

(52) U.S. Cl. .............. 502/439; 502/235; 502/238; 502/263; 502/407; 502/408; 502/409; 502/414; 502/415

(58) Field of Classification Search ............ 502/235, 502/238, 263, 407–409, 414, 415, 439; 501/173, 501/133, 153, 154
See application file for complete search history.

(56) References Cited

U.S. PATENT DOCUMENTS

| | | | | |
|---|---|---|---|---|
| 2,641,044 A * | 6/1953 | Bearer | ................. | 264/624 |
| 2,941,961 A | 6/1960 | Braithwaite | | |
| 3,090,094 A * | 5/1963 | Schwartzwalder et al. | .. | 264/628 |
| 3,397,154 A * | 8/1968 | Talsma | ................. | 502/304 |
| 3,455,368 A | 7/1969 | Shepherd | ................. | 164/16 |
| 3,557,024 A * | 1/1971 | Young et al. | ................. | 502/66 |
| 3,645,914 A * | 2/1972 | Rosinski et al. | ................. | 502/65 |
| 3,652,449 A * | 3/1972 | Young et al. | ............ | 208/111.3 |
| 3,674,526 A * | 7/1972 | Self | ................. | 106/286.2 |
| 3,758,316 A * | 9/1973 | Sowards | ................. | 501/94 |
| 3,943,064 A | 3/1976 | Ballain et al. | ........... | 252/455 R |
| 4,129,522 A | 12/1978 | Michalko | | |
| 4,289,653 A * | 9/1981 | Jaffe | ................. | 502/255 |
| 4,529,718 A * | 7/1985 | Dupin | ................. | 502/439 |
| 4,631,267 A | 12/1986 | Lachman et al. | | |
| 4,637,995 A * | 1/1987 | DeAngelis et al. | ......... | 502/439 |
| 4,657,880 A * | 4/1987 | Lachman et al. | ............ | 502/64 |
| RE34,853 E * | 2/1995 | DeAngelis et al. | ......... | 502/439 |
| 5,516,743 A * | 5/1996 | Dzombak et al. | ........... | 502/355 |
| 5,516,744 A * | 5/1996 | Dzombak et al. | ........... | 502/355 |
| 5,849,852 A * | 12/1998 | Koch et al. | ................. | 526/96 |
| 6,080,345 A * | 6/2000 | Chalasani et al. | .......... | 264/109 |
| 6,372,033 B1 * | 4/2002 | Chalasani et al. | ....... | 106/140.1 |
| 6,437,210 B1 * | 8/2002 | Wu et al. | ................. | 585/663 |
| 6,872,685 B2 * | 3/2005 | Timken | ................. | 502/263 |
| 6,902,664 B2 * | 6/2005 | Timken | ................. | 208/111.01 |
| 6,939,825 B1 * | 9/2005 | Ohno et al. | ................. | 502/439 |

FOREIGN PATENT DOCUMENTS

GB        2 116 868        10/1983

OTHER PUBLICATIONS

Heveling, J., et al., "Catalysts and conditions for the highly efficient, selective and stable heterogeneous oligomerisation of ethylene", *Applied Catalysis. A: General.*, 173, (1998), p. 1-9.

Ochoa, R., et al., "Catalytic degradation of medium density polyethylene over silica-alumina supports", *Fuel Processing Technology.* 49, (1996), p. 119-136.

Rajagopal, S., et al., "Silica-Alumina-Supported Acidic Molybdenum Catalysts-TPR and XRD Characterization", *Journal of Catalysis.*, 147, (1994), p. 417-428.

* cited by examiner

*Primary Examiner*—Cam N. Nguyen
(74) *Attorney, Agent, or Firm*—Randall S. Wayland; Anca C. Gheorghiu

(57) ABSTRACT

Alumina-silica catalyst supports having substantially high surfaces areas are formed by extrusion, drying and firing of a plasticized batch including an alumina-silica powder component, acid, organic binder and water. The alumina-silica powder component can be formed either by the mixing of alumina- and silica-source powders or by forming a slurry therefrom which is spray dried to form a particulate material prior to batching.

14 Claims, No Drawings

METHOD OF PRODUCING ALUMINA-SILICA CATALYST SUPPORTS

BACKGROUND OF THE INVENTION

The present invention relates to ceramic monolithic catalyst or catalyst supports, and, in particular, a process of manufacturing alumina-silica honeycomb catalysts or catalyst supports.

The petrochemical industries currently use a variety of pellet type structures formed of gamma alumina or other oxides, e.g., pellets, pills, beads, rings, trilobes, stars, and so forth, as catalysts or catalyst support media for catalytic reactions. These structures are typically formed by extrusion from batch mixtures of alumina or other selected oxides, followed by drying and calcining. Pellet beds, however, tend to exhibit relatively high flow resistance, and also develop preferential flow paths which exhaust portions of the catalyst while leaving other portions relatively unused.

Monolithic catalyst supports, such as honeycomb structures, have been proposed as an alternative to the aforementioned pellet type structures for providing several advantages. These including lower pressure drop, greater surface area, higher yield, higher selectivity, and more compact reactor designs. Generally, ceramic honeycombs are used in applications in which the monolithic substrate serves simply as a physical structural support for a chemically active, high-surface-area catalyst coating (e.g., a washcoating of alumina deposited on the channel walls of the ceramic honeycomb.) However, for many applications porous washcoatings are inadequate and catalysts or catalyst supports made up mostly or entirely of active, high surface area material must instead be used.

One such application is the hydro-desulfurization of fossil fuels in the petrochemical industry to make low sulfur gasoline and diesel fuels. Since the reaction kinetics are the slow step in such processes, it is important to provide a relatively large accessible BET catalyst support surface (more catalyst sites in a given volume) in order to allow the most effective use of reactor volume. This in turn requires that the entire volume of the catalyst or catalyst support structure be made of active, high-surface-area material, and that the pore structure of the material be such that that the reactants can diffuse in and products diffuse out of the volume of the catalyst support effectively over relatively long distances.

U.S. Pat. No. 4,631,267 relates to the manufacture of extruded honeycombs of alumina, silica and titania compositions that incorporate precursors for permanent silica, alumina and titania binders in powdered alumina, titania or silica extrusion batches. The precursors for the permanent binders are generally liquid solutions or dispersions of oxide-yielding compounds such as titanium isopropoxide or silicone solutions or hydrated alumina slurries, these being converted to small crystallite bonding deposits of the respective oxides on firing.

U.S. Pat. No. 6,365,259 relates to the manufacture of extruded honeycombs of gamma alumina compositions absent permanent binders in the starting batches. The forming process includes providing a powder component of alumina powders including at least one anhydrous alumina powder, which is combined with water, an acid, and a plasticizing temporary binder to form a plasticized mixture. The plasticized mixture is extruded into a honeycomb structure, which is dried and fired.

However, there still remains a need for a process of making silica-alumina catalyst supports of high-surface area, in an effective and economic manner.

SUMMARY OF THE INVENTION

Accordingly, the invention is a method of making an alumina-silica catalyst support which includes the steps of providing a homogenous plasticized batch comprising an alumina-silica powder component in combination with a liquid, an organic binder and an acid of at least 0.25% by weight of the mixture, wherein the alumina-silica powder component is compounded to yield a composition consisting essentially of 2-25 wt. % silica and 75-98 wt. % alumina; extruding the plasticized batch to form a green preform; drying the green preform; and, heating the green preform to a temperature and for a time to provide an alumina-silica body with a surface area of at least 180 $m^2/g$ suitable for use as a catalyst support.

The resulting alumina-silica catalyst supports have a surface area of at least 180 $m^2/g$, preferably at least 250 $m^2/g$, and more preferably 300 $m^2/g$, in combination with high strength of at least 400 psi as measured in four-point bending on a rod, and high pore volume of at least 0.5 cc/g, preferably at least 1.0 cc/g, and more preferably at least 1.25 cc/g.

DETAILED DESCRIPTION OF THE INVENTION

There is provided a method of forming a high-surface-area alumina-silica catalyst support, by direct honeycomb extrusion of plastically deformable batches including an alumina-silica powder component in combination with an acid, water, and an organic binder. Optional batch additions may include one or more surfactants, lubricants or other mixing or extrusion aids, although these are not required to obtain strong, high-surface-area products.

The alumina-silica powder component is composed of alumina and silica-source powders. In one embodiment the alumina-silica powder component is a mixture of 5-60 wt. % fused quartz powder as the silica-source, the remainder an alumina-source selected from the group consisting of gamma-alumina, boehmite, pseudo-boehmite powders.

In another embodiment the alumina-silica powder component is prepared from a slurry comprising a silicon alkoxide as the silica-source, and an alumina-source selected from the group consisting of aluminum oxide, aluminum hydroxide, aluminum oxyhydroxide and mixtures thereof. Other suitable silica sources may include sodium silicate, silica gel, silicic acid, fumed or precipitated silica. The silica-source material comprises 20-85% by weight of the total material in the slurry on a water-free (dry) basis. Preferably, the silica-source material comprises 35-60% by weight of the total material in the slurry on a water-free (dry) basis. The slurry is spray dried according to conventional methods to form a powder having a median particle diameter of 10-25 micrometers. Next, the powder is heated at a temperature of 500-700° C. for a period of 1-5 hours to form a calcined alumina-silica-containing material.

In another embodiment the alumina-silica powder component is prepared from a slurry comprising 2-30% by weight of an alumina-source selected from the group consisting of aluminum oxide, aluminum oxyhydroxide and mixtures thereof. The slurry is spray dried according to conventional methods to form a powder having a median particle diameter of 10-25 micrometers. Next, the powder is heated at a temperature of 500-700° C. for a period of 1-5 hours to form a calcined alumina-containing material. The spray dried and calcined alumina-containing material is combined with a silica-source such as silicon alkoxide and re-formed into a slurry, which is then spray dried to form an alumina-silica material having a median particle diameter of 10-25 micrometers.

In another embodiment the alumina-silica powder component is prepared from a slurry comprising 2-30% by weight of an alumina-source selected from the group consisting of aluminum oxide, aluminum oxyhydroxide and mixtures thereof. The slurry is spray dried according to conventional methods to form a powder having a median particle diameter of 10-25 micrometers. Next, the powder is heated at a temperature of 500-700° C. for a period of 1-5 hours to form a calcined alumina-containing material. A silica-source, such as silicon alkoxide, which contains ~30 wt. % equivalent silica, in an amount of 6-53% by weight, to yield 2-25 wt % silica after calcinations, is added to the calcined alumina-containing material to obtain an alumina-silica material. The amount of silicon alkoxide chosen is effected by its equivalent silica content, which is affected by the extent of hydrolysis, dilution by a miscible agent, such as alcohol, and amount of suspended colloidal silica or silicon hydroxide.

In addition to the alumina-silica powder component, the batch further includes an acid. The use of acetic acid is particularly preferred, although other short-chain organic acids such as forming acid are also suitable. Acid is used in an amount of at least 2% by weight, and preferably 2-5% by weight of based on the total weight of the dry materials in the batch. The acid in the amount described is added to the batch together with the remaining components. Alternatively, the acid may be added to the slurry prior to spray drying.

The inclusion of an inorganic binder in the honeycomb formulations of the invention is helpful to improve the plasticity of the compounded batch for better extrusion characteristics. Suitable organic binders include cellulose ether binders such as methyl cellulose, commercially available as Methocel cellulose ether products from the Dow Chemical Co.

The weight proportions of the alumina-silica powder component, acid, organic binder and water may be adjusted as necessary to obtain a consistency and plasticity desirable for extrusion, together with a wet strength adequate for handling the honeycombs after forming but before firing. Generally, 1-10 wt. % of the selected organic binder are added based on the total weight of the dry materials. Other extrusion aids, such as surfactant, if present, will normally not exceed about 2 wt. % based on the total weight of the dry materials, if conventional materials such as sodium stearate or stearic acid are used.

Prior to introducing the liquid ingredients into the batch, it is desirable that the dry batch components be first thoroughly mixed, for example, in dry blending equipment such as a Littleford™ mixer. Thereafter, the blended dry batch can be transferred to batch blending and plasticizing apparatus such as a mix-muller for combination with the liquid ingredients of the batch. If desired, the plasticized batch produced by the muller or other mixer may then be pre-extruded through a spaghetti die one or several times, to complete the mixing process and remove any air inclusions from the mixture prior to final forming.

Forming of the plasticized batch into honeycombs or other products can be carried out utilizing ordinary extrusion equipment together with any of the known ceramic honeycomb dies employed for honeycomb extrusion in the prior art. The handling characteristics of the batches provided according to the invention are such that a relatively wide range of honeycomb geometries can readily be produced. Honeycombs having cell wall thicknesses in the range of 0.1-2 mm and cell densities in the range of 10-600 cells/in$^2$ of honeycomb cross-section can be formed with commercially available ceramic ram or screw extruders and ceramic honeycomb extrusion dies of appropriately selected dimensions and cell shapes.

Extruded honeycomb shapes produced as above described may be dried in accordance with practices conventional for the production of ceramic honeycombs. Firing of the dried honeycombs is carried out at relatively low temperatures, generally in the range of 500-1000° C. with a hold at top temperature of 1-5 hours.

The invention is further described in the following examples, which are intended to be illustrative rather than limiting.

EXAMPLES

Batches for extruded alumina-silica honeycombs are compounded by first preparing an alumina-silica powder. In Examples 1 the alumina-silica powder includes 81 wt. % of LaRoche Versal GH-22-140M gamma-alumina powder, 9 wt. % LaRoche V-700 pseudo-boehmite (alumina hydrate) powder (available from LaRoche Industries, Inc.), and 10 wt. % fused quartz 44I CE Mineral, such that a silica content of 10 wt. % is obtained in the final product.

In Example 2 the alumina-silica powder is prepared from a slurry of boehmite alumina (hydrated alumina) powder (available from Alcoa or Sasol) and hydrolyzed tetraethylortho silicate (TEOS) (available from Silbond) formulated to yield 5 wt. % silica and 95 wt. % alumina after calcination. The slurry is spray dried using a commercially available spray drier, such as Niro MobleMinor Model 2000 Type H, to form a powdered material having a median particle size of 15.52 micrometers, and then calcined (heated) at 600° C. for 1 hour.

In Example 3 a slurry of boehmite alumina powder and ethyl polysilicate Silbond® 40 (available from Silbond® Corp.) is prepared and formulated to yield 5 wt. % silica and 95 wt. % alumina after calcination. The slurry is spray dried to form a powdered material having a median particle size of 18.15 micrometers, and then calcined at 600° C. for 1 hour.

In Example 4 a slurry of boehmite alumina powder having a solid loading of 20-30 wt. % is prepared. The slurry is spray dried, and the resulting particulate material is calcined at 600° C. for 1 hour. A second slurry is prepared including the calcined alumina material and TEOS in an amount formulated to yield 5 wt. % silica and 95 wt. % alumina after calcination. The calcined alumina-TEOS slurry is spray dried to obtain a powder having a particle size of 20.27 micrometers. The resulting powdered material is not calcined.

In Example 5 a slurry of boehmite alumina powder having a solid loading of 20-30 wt. % is prepared. The slurry is spray dried to obtain an alumina powder having a particle size of 20.48 micrometers, and then calcined at 600° C. for 1 hour. The calcined alumina powder material is mixed with TEOS in an amount to yield a 5 wt. % silica and 95 wt. % alumina material.

The alumina-silica powdered material is charged into a Littleford™ mixer along with 6 wt. % of F40M methyl cellulose binder (available from Dow Chemical Co.). Acetic acid (2 wt. % for Example 1, and 4 wt. % for Examples 2-5) is mixed with water and then combined with the dry ingredients in a mix-muller, the water being added in a proportion of about 30-200 wt. % based the alumina-silica powdered material. Mixing of the combined dry and liquid ingredients is effected to achieve homogeneity and plasticity in the batch.

The batch thus prepared is loaded into a ram extruder and formed into green honeycomb and rod preforms. The honeycombs thus provided are about 3 inches in diameter with a cell density of 100-200 cells per square inch and a cell wall thickness of 0.012-0.025 inches.

The resulting wet preforms are dried and fired in air in a temperature-controlled oven by heating from 30-60° C. over a heating interval of 150 hours while reducing the relative humidity (RH) in the oven from 95% to 50%. Next, the dried honeycombs are fired in an electric kiln to a peak temperature of 600° C. A set of samples according to Examples 2-5 are dielectrically (DI) dried at a temperature of 100° C. for 10 minutes and then fired to a peak temperature of 600° C.

The fired honeycombs and rods are then examined to determine pore volume (cc/g), and median pore diameter (Å) by mercury intrusion porosimetry, BET surface area ($m^2/g$), and modulus of rupture in four-point bending. The results are summarized in the Table provided. The data for Examples 2-5 is divided into RH for honeycomb samples dried under relative humidity conditions, DI for honeycomb samples dried under dielectric drying conditions, and ROD for extruded rods. As the data shows all samples exhibited large surface area, high pore volume and good strength.

It will become apparent to those skilled in the art that various modifications to the preferred embodiments of the invention as described herein can be made without departing from the spirit or scope of the invention as defined by the appended claims.

TABLE

| Example | Modulus of Rupture (psi) | BET Surface Area ($m^2/g$) | Pore Volume (cc/g) | Median Pore Diameter (Å) |
| --- | --- | --- | --- | --- |
| 1ROD | 1618 | 186 | 0.56 | 182 |
| 2DI | 137 | 267 | 1.45 | 241 |
| 2RH | 196 | 277 | 1.41 | 198 |
| 2ROD | 421 | 277 | 1.41 | 228 |
| 3DI | 262 | 290 | 1.29 | 171 |
| 3RH | 257 | 302 | 1.34 | 169 |
| 3ROD | 792 | 319 | 1.23 | 133 |
| 4DI | 182 | 242 | 1.26 | 201 |
| 4RH | 203 | 244 | 1.31 | 192 |
| 4ROD | 450 | 245 | 1.29 | 186 |
| 5DI | 243 | 241 | 1.25 | 192 |
| 5RH | 270 | 244 | 1.23 | 185 |
| 5ROD | 444 | 243 | 1.32 | 195 |

What is claimed:

1. A method for making an alumina-silica catalyst support comprising:
   a. providing a homogeneous plasticized batch comprising an alumina-silica powder component in combination with a liquid, an organic binder and an acid of at least 0.25% by weight of the mixture, wherein the alumina-silica powder component is compounded to yield a composition consisting essentially of 2-25 wt. % silica and 75-98 wt. % alumina;
   b. extruding the plasticized batch to form a green body;
   c. drying the green body; and,
   d. heating the green body to a temperature and for a time to provide an alumina-silica body having a surface area of between 186 and 302 $m^2/g$ for use as a catalyst support.

2. The method of claim 1 wherein the alumina-silica powder component is formed by mixing an alumina-source selected from the group consisting of gamma-alumina, boehmite, pseudo-boehmite and mixtures thereof, together with a fused quartz.

3. The method of claim 1 wherein the alumina-silica powder component is formed by:
   a. providing a slurry of an alumina-source and silicon alkoxide, wherein the alumina-source is selected from the group consisting of aluminum oxide, aluminum hydroxide, aluminum oxyhydroxide and mixtures thereof;
   b. spray drying the slurry;
   c. heating the spray dried material to a temperature of between 500-700° C. for a period of 1-5 hours to form a calcined material.

4. The method of claim 3 wherein the acid is added to the slurry to obtain a pH of between 1-5.

5. The method of claim 1 wherein the alumina-silica powder component is formed by:
   a. providing a slurry comprising an alumina-source selected from the group consisting of aluminum oxide, aluminum hydroxide, aluminum oxyhydroxide and mixtures thereof;
   b. spray drying the slurry to obtain a first particulate material;
   c. heating the first particulate material to a temperature of between 500-700° C. for a period of 1-5 hours to form an alumina-containing calcined material;
   d. forming a second slurry comprising the alumina-containing calcined material in combination with silicon alkoxide; and,
   e. spray drying the second slurry.

6. The method of claim 5 wherein the acid is added to the slurry to obtain a pH of between 1-5.

7. The method of claim 1 wherein the alumina-silica powder component is formed by:
   a. providing a slurry comprising of an alumina-source selected from the group consisting of aluminum oxide, aluminum hydroxide, aluminum oxyhydroxide and mixtures thereof;
   b. spray drying the slurry;
   c. heating the spray dried material to a temperature of between 500-700° C. for a period of 1-5 hours to form an alumina-containing calcined material; and,
   d. adding silicon alkoxide to the alumina-containing calcined material.

8. The method of claim 7 wherein the acid is added to the slurry to obtain a pH of between 1-5.

9. The method of claim 1 wherein the green body is a honeycomb monolith.

10. The method of claim 1 wherein the alumina-silica catalyst support has a surface area of at least 250 $m^2/g$.

11. The method of claim 1 wherein the step of heating is between 500° C. and 1000° C.

12. The method of claim 1 further including acetic acid.

13. A method for making an alumina-silica catalyst support comprsing:
   a. providing a homogeneous plasticized batch comprising an alumina-silica powder component in combination with a liquid, an organic binder and an acid of at least 0.25% by weight of the mixture, wherein the alumina-silica powder component is compounded to yield a composition consisting essentially of 2-25 wt. % silica and 75-98 wt. % alumina;
b. extruding the plasticized batch to form a green body;
c. dryina the green body; and,
d. heating the green body to a temperature and for a time to provide an alumina-silica body having a surface area of at least 180 m²/g for use as a catalyst support and wherein the alumina-silica catalyst support has a median pore diameter of between 133 and 241Å.

14. A method for making an alumina-silica catalyst support comprising:
a. providing a homogeneous plasticized batch comprising an alumina-silica powder component in combination with a liquid, an organic binder and an acid of at least 0.25% by weight of the mixture, wherein the alumina-silica powder component is compounded to yield a composition consisting essentially of 2-25 wt. % silica and 75-98 wt. % alumina;
b. extruding the plasticized batch to form a green body;
c. drying the green body; and,
d. heating the green body to a temperature and for a time to provide an alumina-silica body having a surface area of at least 180 m²/g for use as a catalyst support and wherein alumina-silica catalyst support has a modulus of rupture in four-point bending of between 137 psi and 1618 psi.

* * * * *